United States Patent [19]
Ono et al.

[11] 3,893,928

[45] July 8, 1975

[54] CARBONACEOUS COMPOSITE MATERIAL AND PROCESS FOR PREPARING SAME

[75] Inventors: Katsuhiro Ono; Haruo Shikuma; Tadao Shigeta; Toshihide Nishimura; Makoto Kitamura, all of Chiba, Japan

[73] Assignee: Idemitsu Kosan Co., Ltd., Tokyo-to, Japan

[22] Filed: July 14, 1972

[21] Appl. No.: 271,736

[30] Foreign Application Priority Data
July 17, 1971 Japan.............................. 46-53284
July 20, 1971 Japan.............................. 46-54465

[52] U.S. Cl................ 252/1; 264/29; 264/DIG. 6; 106/290; 106/307; 428/406
[51] Int. Cl............................................. B32b 5/16
[58] Field of Search ...... 161/168, 182, 236, DIG. 5; 264/29, DIG. 6; 260/2.5 B, 2.5 D; 117/46 R, 46 CC, 46 CB

[56] References Cited
UNITED STATES PATENTS

| | | |
|---|---|---|
| 2,806,509 | 9/1957 | Bozzacco et al................... 161/162 |
| 3,325,341 | 6/1967 | Shannon............................ 161/168 |
| 3,547,677 | 12/1970 | Gentilhomme et al. ............. 264/29 |
| 3,567,807 | 3/1971 | Shannon........................ 260/2.5 D |
| 3,585,155 | 6/1971 | Hollstein.......................... 260/2.5 D |
| 3,651,179 | 3/1972 | Shea et al. ............................ 264/29 |
| 3,672,936 | 6/1972 | Ehrenreich .......................... 264/29 |
| 3,682,686 | 8/1972 | Nakamura et al. .................... 264/29 |

Primary Examiner—William J. Van Balen
Assistant Examiner—William R. Dixon, Jr.
Attorney, Agent, or Firm—William J. Daniel

[57] ABSTRACT

Lightweight, incombustible carbonaceous composite materials of improved mechanical properties, especially compression strength and bending strength, are prepared by baking an intimate mixture of a pitch and small vitreous spheres or microballoons in the presence of an inorganic reinforcing agent. The reinforcing agent may be initially admixed with the mixture or coated on the surface of the spheres prior to mixture with the pitch.

2 Claims, No Drawings

3,893,928

CARBONACEOUS COMPOSITE MATERIAL AND PROCESS FOR PREPARING SAME

BACKGROUND OF THE INVENTION

This invention relates to new carbonaceous composite materials and to a process for preparing same. More particularly, this invention relates to light-weight, incombustible carbonaceous composite materials composed essentially of carbon, vitreous microspheres or microballoons and an inorganic reinforcing agent, as well as a process for the preparation of the carbonaceous composite materials by baking an intimate mixture of a pitch and vitreous microballoon in the presence of an inorganic reinforcing agent.

In recent years, small spheres of vitreous or glassy materials, often referred to as "balloons" and "microballoons" have been developed. The microballoon is prepared by adding a foaming agent and a small amount of boric acid to sodium silicate and subjecting the foamed mixture to drying followed by baking. A similar product can be prepared from natural materials, without using any foaming agent, merely by subjecting a volcanic vitreous substance called "Shirasu" (native to Kyushu District in Japan) to heat treatment to produce what is known as a "Shirasu balloon". Such balloons, or more usually microballoons because of their very small size, generally have a low specific gravity with a corresponding high melting point and are incombustible. In addition, such balloons or microballoons are low in thermal conductivity and excellent in mechanical strength. Such properties make microballoons particularly useful as fillers for synthetic resins, asphalt, carbonaceous materials, latice, cement, gypsum, magnesite, ceramics and metals.

Vitreous balloons or microballoons, when admixed with petroleum or coal pitch and baked to effect carbonization, give a carbonaceous composite material improved in various properties. However, it has been found that the composite material thus obtained does not possess optimum mechanical strength, especially in compression strength and bending strength, and accordingly, the fields of use for such composite material are narrowly limited. Thus, there is a strong demand for carbonaceous composite materials of improved mechanical strength capable of tolerating even practical rugged use.

It is an object of this invention to provide a lightweight, incombustible carbonaceous composite material of improved mechanical properties, especially in compression strength and bending strength.

It is another object of this invention to provide a process for the preparation of said lightweight, incombustible carbonaceous composite material.

These and other objects of this invention will become apparent as the description proceeds.

GENERAL DESCRIPTION OF THE INVENTION

Surprisingly, we have found that the addition of an inorganic reinforcing agent as a third component overcomes the defect in mechanical properties of carbonaceous composite materials and attains the above mentioned objects.

In accordance with this invention, lightweight, incombustible carbonaceous composite materials of improved mechanical strength, especially in compression strength and bending strength, are prepared by baking a molded mixture of a pitch and vitreous microballoon in the presence of an inorganic reinforcing agent, either admixed concurrently with the other constituents or coated on the surface of the vitreous microballoon prior to mixture with the pitch.

Illustrative of inorganic reinforcing agents useful in this invention are metallic reinforcing agents including metals per se, metal oxides and metal salts such as metal chlorides, as well as non-metallic reinforcing agents having a high melting point such as boron and silicon compounds. More specifically, the inorganic reinforcing agents include metal powders such as aluminum powder, zinc dust and chromium powder; oxides such as nickel oxide, tungsten oxide, boron oxide, molybdenum oxide, tin oxide, cobalt oxide, barium peroxide and zinc oxide; chlorides such as potassium chloride, stannic chloride, barium chloride, manganese chloride, ferric chloride, calcium chloride and cadmium chloride; nonmetallic substances such as coke powder, glass powder, lead-free glazing agent and boric acid; and other salts such as ammonium tungstate, cupric sulfate, sodium carbonate and potassium permanganate.

By the term vitreous balloon or microballoon as used herein is meant vitreous or glassy hollow microparticles or microspheres obtained by expanding by heating natural volcanic glassy materials or artificial glasses prepared in the presence of a foaming agent. The pitch used in this invention may be the conventional kinds obtained in the coal and petroleum industries.

According to one embodiment of the process of this invention, the inorganic reinforcing agent is thoroughly mixed with the pitch and vitreous microballoon, the resulting mixture is molded into a suitable form and then baked to effect carbonization. In this embodiment, the vitreous microballoon is used in an amount of 400–100 parts by weight, preferably 230–150 parts by weight per 100 parts by weight of a coal or petroleum pitch, while the inorganic reinforcing agent is employed in an amount of 1–20% by weight, preferably 2–10% by weight based on the total amount of the vitreous microballoon and the pitch. No special limitation is necessary for the particle size of the vitreous microballoon but one having a particle diameter of more than 100 $\mu$ and a true specific gravity of 0.3–0.5 is advantageously used for general purposes. The inorganic reinforcing agent is usually added to a previously formed mixture of the pitch and the vitreous microballoon but may be mixed simultaneously with these ingredients. When the pitch is mixed in advance with the vitreous microballoon, the mixing treatment is generally conducted by milling the ingredients preferably for 3–5 minutes at a temperature of 250° –320°C by application of an external heating medium, then cooling the hot mixture to room temperature and finally pulverizing the cold mixture so that the resultant mixture has a particle diameter of, for example, 500–700 $\mu$. The molding treatment is generally carried out by way of compression molding, preferably at a temperature of 120°–190°C under pressure of 10–30 kg./cm². In case the molding treatment is carried out under these conditions the time required for molding is about 3–10 minutes. The baking treatment of the molded mixture is carried out in a reducing atmosphere in conventional ways, for example, by heating the mixture in an electric furnace at a temperature up to 1000°C, whereby carbonization of the mixture is effected. In this case, it is desirable that the temperature is elevated gradually from room temperature to 500°C and then rapidly to 1000°C, with the time for heating up to 1000°C being preferably controlled to 5–6 hours. No particular difficulty has been encountered in carrying out the individual treatments of mixing of the ingredients, molding of the mixture and baking for carbonization.

According to another embodiment of the process of this invention, the inorganic reinforcing agent is applied as a thin coating on the surface of the vitreous microballoon prior to admixture with the pitch. This coating treatment is carried out, for example, by dissolving or dispersing the inorganic reinforcing agent into a suitable solvent such as water, alcohol, ketone and ether, dipping the vitreous microballoon into the solvent at ambient temperature or an elevated temperature for about 30 minutes and then drying the vitreous microballoon at a temperature of 70°–100°C for 2–5 hours. The coating treatment may also be carried out directly by means of vapor deposition or like techniques. In this embodiment, the inorganic reinforcing agent is preferably a metallic compound and more preferably a water-soluble metal salt. In the latter case, the coating treatment can be performed in a very simple and easy manner by immersing the vitreous microballoon in an aqueous solution of the metal salt and thereafter drying the microballoon to precipitate thereon the metal salt as a thin coating. Examples of preferable water-soluble metal salts include nickel chloride, calcium chloride, ferric chloride, manganese chloride, cupric chloride, magnesium chloride, other corresponding halides such as bromides, cupric sulfate and potassium permanganate. Such metal salt is employed usually at a concentration of 0.15–3.0% by weight in an aqueous solution and enough is applied to the microballoon to provide 0.5–5.0% by weight, preferably 0.5–3.0% by weight, of the metal salt based on the vitreous microballoon. The vitreous microballoon having the inorganic reinforcing agent coated thereon possesses a strong affinity to the pitch and thus gives a carbonaceous composite material of improved mechanical strength when mixed with the pitch and worked up as described in the first embodiment. The treatment for mixing the coating vitreous microballoon with the pitch can be carried out as described in the first embodiment, for example, by using an external heating medium. The molding and baking treatments of the resulting mixture can also be carried out in a manner identical with that described in the first embodiment.

The carbonaceous composite material obtained in accordance with the process of this invention is remarkably improved, irrespective of whether it is prepared according to the first or second embodiment, in mechanical properties such as compression strength and bending strength, as compared with a similar carbonaceous composite material prepared without the inorganic reinforcing agent. Carbonaceous composite material possessing such excellent mechanical properties has not been known hitherto. Because of such excellent mechanical properties, the carbonaceous composite material of this invention can be used as a high quality industrial material in a wide varity of fields.

This invention will be explained more in detail by the following examples but it is to be understood that these examples are given only for the purpose of illustration and are not intended to limit the scope of this invention.

EXAMPLE 1

This Example illustrates the embodiment where a pitch, vitreous microballoon, and an inorganic reinforcing agent are mixed simultaneously to form a thorough mixture of the three ingredients prior to shaping and baking.

In a beaker of adequate capacity are placed 20 g. of petroleum pitch (prepared by treating straight asphalt at 410°C for 30 minutes in nitrogen atmosphere) and 30 g. of Shirasu microballoon (true specific gravity: 0.385; prepared by baking a vitreous volcanic material called Shirasu and collecting a fraction containing particles of 149–297 $\mu$ in diameter). The mixture is stirred, with the temperature being maintained at 280°C, using a solution of potassium nitrate and sodium nitrate as an external heat medium. The mixture thus treated is cooled to room temperature until solid and pulverized mechanically whereby the particle size is evenly controlled. The particles are thoroughly admixed with a given amount of a selected inorganic reinforcing agent identified in Table 1 to form a uniform mixture. The mixture is then molded at 170°C for 5 minutes under a pressure of 20 kg./cm$^2$ by the aid of a compression molding machine to form moldings (50×100×12 mm) which are then placed in a porcelain vessel, surrounded with a carbonaceous powder to fill therewith the space between the moldings and the vessel, and then baked in an electric furnace to effect carbonization. In this case, the heating conditions in the furnace are as follows: elevation of the temperature from room temperature to 500°C in 3 hours, maintenance of the temperature at 500°C for one hour and elevation of the temperature from 500° to 1000°C in 2 hours.

Table 1 shows the relation between the mechanical properties of the resulting composite material consisting essentially of carbon, vitreous microballoon and the respective reinforcing agents. For the purpose of comparison, the results obtained with a similar product free of inorganic reinforcing agent are also shown in Table 1 as control.

Table 1

| Inorganic reinforcing agent | | Mechanical properties of composite material | |
|---|---|---|---|
| Name | Amount (g.) | Bulk density (g./cm$^3$) | Compression strength (kg./cm$^2$) | Bending strength (kg./cm$^2$) |
| Boron oxide | 1 | 0.839 | 216 | 96 |
| " | 3 | 0.834 | 302 | 137 |
| " | 5 | 0.914 | 396 | 126 |
| Tungsten oxide | 1 | 0.958 | 160 | 90 |
| " | 3 | 0.999 | 204 | 95 |
| " | 5 | 1.013 | 239 | 98 |
| Nickel oxide | 1 | 0.967 | 231 | 90 |
| " | 3 | 0.966 | 236 | 89 |
| " | 5 | 0.947 | 239 | 92 |
| Barium peroxide | 2.5 | 0.929 | 237 | 102 |
| Molybdenum oxide | 5 | 0.904 | 234 | 90 |
| Stannic oxide | 5 | 0.897 | 218 | 90 |
| Lead oxide | 5 | 0.981 | 216 | 111 |
| Zinc oxide | 3 | 0.932 | 182 | 116 |
| Cobalt oxide | 5 | 0.911 | 230 | 113 |
| Barium chloride | 5 | 0.990 | 278 | 114 |
| Nickel chloride | 5 | 0.872 | 200 | 94 |
| Aluminum powder | 5 | 0.964 | 318 | 121 |
| Chromium powder | 5 | 0.915 | 190 | 91 |
| Boric acid | 3 | 0.895 | 259 | 109 |
| " | 5 | 0.919 | 357 | 152 |
| Lead-free glazing agent | 5 | 0.937 | 280 | 142 |
| Coke powder | 5 | 0.902 | 205 | 94 |
| Sodium carbonate | 5 | 0.960 | 250 | 123 |
| None (control) | — | 0.849 | 175 | 84 |

EXAMPLE 2

A mixture of carbon and Shirasu microballoon is prepared in a manner similar to that described in Example 1, using 20 g. of coal pitch, 30 g. of Shirasu microballoon and a given amount of a selected inorganic reinforcing agent identified in Table 2. The relation between the mechanical properties of the resulting composite material and the respective inorganic reinforcing agents used is also shown in Table 2.

Table 2

| Inorganic reinforcing agent | | Mechanical properties of composite material | | |
|---|---|---|---|---|
| Name | Amount (g.) | Bulk density (g./cm$^3$) | Compression strength (kg./cm$^2$) | Bending strength (kg./cm$^2$) |
| Boron oxide | 5 | 0.965 | 295 | 126 |
| Boric acid | 5 | 0.952 | 298 | 124 |
| Tungsten oxide | 5 | 1.025 | 182 | 110 |
| None (control) | — | 0.885 | 106 | 77 |

EXAMPLE 3

This Example illustrates the embodiment where a coating of an inorganic reinforcing agent is formed on the surface of vitreous microballoon prior to mixing with a pitch.

Thirty grams of Shirasu microballoon having a particle diameter of 297–147 μ and a true specific gravity of 0.385 is dipped for 30 minutes in an aqueous solution of 0.3 g. (1% by weight based on the Shirasu microballoon) of a metal salt and then stirred. The Shirasu microballoon is then separated from the solution and dried in vacuo at 80°C for about 3 hours. The surface-treated Shirasu microballoon is placed in a beaker together with 20 g. of petroleum pitch (prepared by treating straight asphalt at 410°C for 30 minutes in nitrogen atmosphere) and stirred at 280°C, using a solution of potassium nitrate and sodium nitrate as an external heating medium. The resulting mixture is cooled to room temperature until solid and pulverized mechanically whereby the particle size is evenly controlled. The particles are molded at a temperature of 190°–200°C for 5 minutes under pressure of 4 kg./cm$^2$ (gauge) by the aid of a compression molding machine to form moldings (50×100×12 mm). The moldings are then placed in a porcelain vessel, surrounded with a carbonaceous powder to fill therewith the space between the moldings and vessel, and baked in an electric furnace to effect carbonizaton. In this case, the heating conditions adopted are as follows: elevation of the temperature from room temperature to 500°C in 3 hours, maintenance of the temperature at 500°C for one hour and elevation of the temperature from 500° to 1000°C in 2 hours.

Table 3 shows the relation between the mechanical properties of the resulting composite material and the type of metal salt used as the reinforcing agent.

Table 3

| Type of metal salt (in hydrated form except potassium permanganate | Mechanical properties of composite material | | |
|---|---|---|---|
| | Bulk density (g./cm$^3$) | Compression strength (kg./cm$^2$) | Bending strength (kg./cm$^2$) |
| Nickel chloride | 0.945 | 230 | 103 |
| Ferric chloride | 0.883 | 205 | 95 |
| Manganese chloride | 0.969 | 210 | 83 |
| Cupric chloride | 0.858 | 200 | 105 |
| Magnesium chloride | 0.884 | 210 | 105 |
| Calcium chloride | 0.932 | 235 | 86 |
| Cupric sulfate | 0.914 | 200 | 100 |
| Potassium permanganate | 0.940 | 210 | 85 |
| None (control) | 0.826 | 183 | 83 |

EXAMPLE 4

An experiment is carried out similar to Example 3 except that the Shirasu microballoon was treated with aqueous solutions of nickel chloride ($NiCl_2 \cdot 6H_2O$) in various specified concentrations. The results obtained are shown in Table 4.

Table 4

| Amount of nickel chloride (with % based on balloon) | Mechanical properties of composite material | | |
|---|---|---|---|
| | Bulk density (g./cm$^3$) | Compression strength (kg./cm$^2$) | Bending strength (kg./cm$^2$) |
| 0.5 | 0.895 | 230 | 103 |
| 1.0 | 0.870 | 230 | 103 |
| 3.0 | 0.875 | 235 | 110 |
| 5.0 | 0.879 | 200 | 90 |

What is claimed is:

1. Carbonaceous composite material consisting essentially of discrete hollow vitreous microspheres and powdered inorganic reinforcing agent generally uniformly distributed in a carbonized pitch or asphalt binder, said reinforcing agent being selected from the group consisting of a metal, metal salt, and metal oxide, said microspheres being present in an amount having a weight ratio relative to said carbonized binder of about 4:1–1:1 and said reinforcing agent constituting about 1–20% by weight of the aggregate weight of the microspheres and carbonized binder.

2. Carbonaceous composite material consisting essentially of a carbonized pitch or asphalt binder and generally uniformly distributed therein discrete hollow vitreous microspheres having a thin surface coating of a metal or metal salt, said metal or metal salt being present in an amount within the range of about 0.5–5.0% by weight of said microspheres and said microspheres being present in a ratio by weight of about 4:1–1:1 relative to said binder.

* * * * *